May 6, 1958  N. V. S. KNIBBS ET AL  2,833,626
HYDRATION OF LIME AND ALLIED SUBSTANCES
Filed Aug. 18, 1955
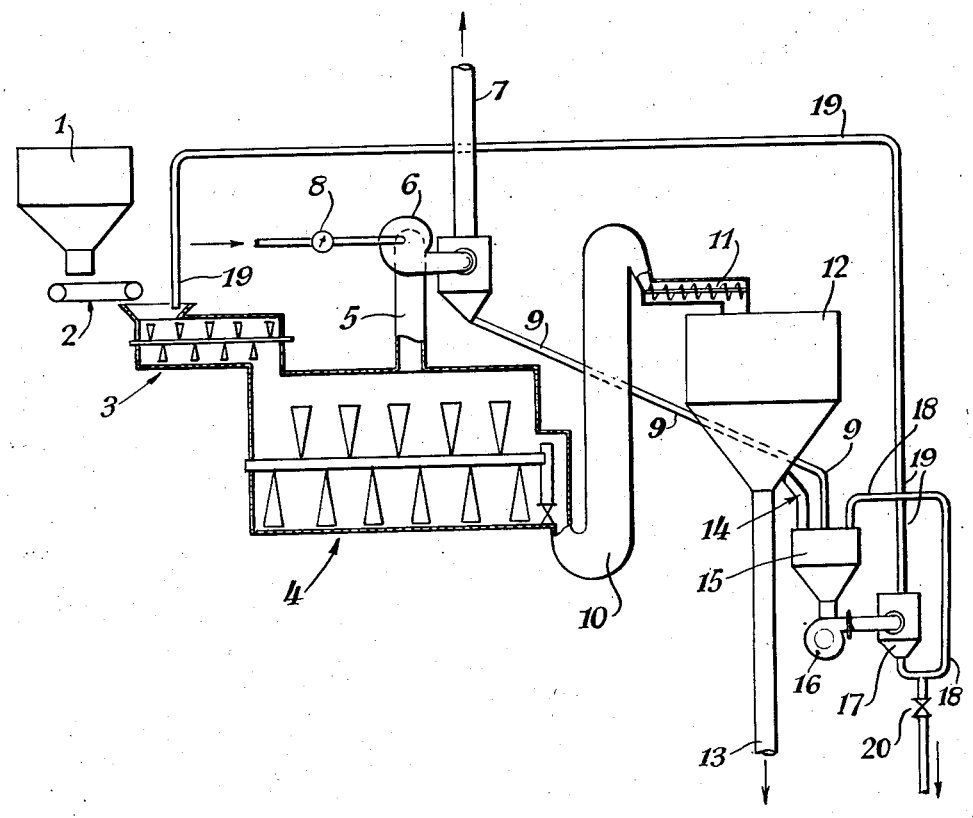

United States Patent Office 2,833,626
Patented May 6, 1958

2,833,626

HYDRATION OF LIME AND ALLIED SUBSTANCES

Norman Victor Sydney Knibbs and Edward George Stanley Thyer, Longfield, England, assignors to Fawham Developments Limited, London, England Application August 18, 1955, Serial No. 529,196

10 Claims. (Cl. 23—188)

This invention relates to an improved process for the hydration of high-calcium lime, dolomitic lime, hydraulic lime, and like substances to produce a hydrated lime powder and particularly in the reduction in or elimination of the quantity of coarse hydrated lime formed in the process and the improvement of the properties of the fine hydrated lime produced.

In the process of hydration to produce a dry hydrated lime, water is added to quicklime and combines with it, the heat of hydration being dissipated by using an excess of water, which is evaporated. During hydration the lime disintegrates and generally the greater part of it is reduced to a finely divided hydrated lime powder, but some of it remains gritty or lumpy. The coarse material includes any unburnt carbonate, overburnt lime and any impurities such as fuel ash, that may be present, but it also includes coarse hydrated lime, the amount of which varies with the type of lime being hydrated and the method of hydration employed. For example, highly reactive lime may hydrate to a relatively coarse hydrate and also, particularly with dolomitic lime there may be an increase of grain size during the process of hydration or in the period immediately following hydration.

It is usual to subject the material from the hydrator to a process to separate the fine material from the coarse, and the tailings from this process of separation are either discarded or they may be milled to reduce them to the required fineness. If the are rejected without milling there is always some loss of good hydrated lime, in the form of coarse particles, and also as fine particles adhering to the coarse or separated with it because of the imperfection of the separator. The system in which the tailings from the separator pass through a mill and are returned in closed circuit to the separator ensures full recovery of the hydrated lime but it also results in the contamination of the hydrate with the impurities already mentioned, and one of the principal purposes of the separation process—to remove the impurities—is defeated.

The present invention consists of a process for the hydration of lime in which the tailings from the subsequent separation process are treated with water, the fine suspended materials separated from the coarse, and the fine suspension employed, instead of ordinary water, for hydration of the quicklime.

We have found that the tailings or residue after separation of the fine hydrated lime are readily dispersed in water and that the suspension of finely divided hydrated lime which results from the water treatment is readily separated from the impurities by a hydraulic classifier or other known device for separating coarse and fine particles in water suspension. We have also found that agitation in water tends to break up or disperse the lime leaving the impurities unchanged, and that such hydraulic agitation therefore provides a much more effective means of separating lime from impurities. The effect we have discovered seems to be due partly to the marked tendency of hydrated lime aggregates to disperse in water, and partly to the influence of hydraulic agitation in promoting the hydration of incompletely hydrated particles of lime due, we think, to the shearing away of surface coatings of hydrate thus allowing access of water to underlying quicklime.

The process of hydration according to the present invention therefore consists in reacting quicklime and water in an agitated vessel or hydrator, separating the product into coarse and fine particles, agitating the coarse particles with water, and using the resulting suspension of lime in water, with or without separation into two fractions, for reacting with the quicklime in the hydrator.

The hydrating vessel or hydrator may be of any known type but should preferably be of the type which operates continuously and which has a premixer; that is to say, a rapid mixer for mixing the quicklime and water prior to its entry with the main body of the hydrator. The hydrator should also preferably be of the type which is completely or nearly completely enclosed and is accompanied by a washer-preheater; that is to say, a device in which the dust, which is always entrained in the steam evolved in the hydrator by evaporation of the excess water, is recovered by washing it out of the steam by the water used for hydration, that water being simultaneously heated. In this case the preheated milk of lime from the washer-preheater is used to mix with the coarse material from the separator.

The separator used to separate the fine hydrate from the product discharged from the hydrator may be of any type, including an ordinary screen, but is preferably of the kind known as a mechanical air separator.

The suspension of tailings in water may be subjected to any desired degree of agitation, from simple mixing to milling in a tube, rod or ball mill. Some limes form loose aggregates on hydration which require mere admixture with water for their dispersion. Others require the more violent agitation which may be provided, for example, by a centrifugal pump, through which the mixture may circulate many times. When a mill is employed, we have found that rubber-coated balls or rods are effective in breaking down the lime particles or aggregates with minimum disintegration of the impurities.

The finely dispersed particles may be separated from the coarse by settling or by any desired form of hydraulic separator, but we have found that a wet cyclone is a compact and effective unit to employ. The underflow from the wet cyclone or other separator may be returned to the pump or other agitator or it may be removed from the system continuously or intermittently. Some limes that are hydrated, for example, are so pure that they have very little unhydratable residue. When treating such limes the underflow from the separator may be returned continuously or discarded only at long intervals. The overflow or fine suspension is used in the hydrator.

Where the lime is relatively impure and there is always a considerable amount of unhydratable residue the underflow from the wet cyclone or other separator, which is in the form of wet sand, may be drained in an inclined worm conveyor or other known form of conveyors and a small amount of clean water may be used to remove adhering milk of lime, so that the unhydratable tailings are discharged like clean sand.

An important advantage of the treatment according to this invention is that any unhydrated or incompletely hydrated lime is completely wetted in the process and passed through the hydrator again, being therefore subjected to most favourable conditions for complete hydration.

The accompanying diagrammatic drawing illustrates one form of carrying out the invention.

Quicklime, which should preferably be crushed to ½-inch or less, is contained in the hopper 1 and is fed in measured amount by the constant-weight feeder 2 to the premixer 3 where it is rapidly agitated with the lime suspension produced as described later. From the premixer the lime and water mixture enter the main body of the hydrator 4, where it is slowly agitated and where the two components react to form hydrated lime, the excess heat being dissipated by producing steam which leaves the hydrator by a tube 5 and enters the washer-preheater 6 where the dust is washed out of the steam. Steam or steam and air leave the plant by tube 7 to atmosphere. Clean water in controlled amount enters the washer-preheater by the meter 8 and the hot milk of lime resulting from the action of the washing process leaves by pipe 9.

The hydrated lime produced in 4 is raised by elevator 10 and passes through a worm conveyor 11 to an air separator 12 where it is divided into coarse and fine, the fine hydrate leaving by tube 13 to storage or a bagging machine. The coarse fraction, or tailings, leaves the separator by tube 14 and enters the receiving tank 15, which is maintained about three quarters full of liquid.

The plant here illustrated is the modification used with high quality lime, where the unhydratable residue is small. Tank 15 receives the tailings, milk of lime from the washer-preheater via pipe 9, and also recirculated suspension via pipe 18. A pump 16, which conveniently may be of the centrifugal type, draws from tank 15, and delivers to the wet cyclone 17, the underflow from which is recirculated via pipe 18 whilst the overflow, containing only finely divided lime, passes to the premixer via pipe 19. The tailings treatment plant is therefore receiving water continuously via meter 8 and the washer-preheater and losing water via 19 to the premixer, and the two quantities are kept equal by maintaining a constant level in tank 15, either manually or automatically, for example by control acting on a valve in the recirculating pipe 18. When it is desired to discard the treated tailings from the system valve 20 is opened and the desired amount ejected.

We claim:

1. In a process for the hydration of lime wherein quicklime is admixed with water in a hydrating zone to produce powdered hydrated lime and tailings, said tailings being of a larger particle size than that of said hydrated lime, said tailings consisting essentially of unhydrated lime and a nonhydratable residue, the improvement which comprises mixing said tailings with water in an agitation zone to produce an aqueous mixture including additional hydrated lime and said residue, introducing said aqueous mixture to a settling zone to produce an overflow of said additional hydrated lime in aqueous suspension and passing said overflow to said hydrating zone.

2. The improved process as set forth in claim 1 including the step of grinding said tailings in said agitation zone.

3. In a process for the hydration of lime wherein quicklime is admixed with water in a hydrating zone to produce powdered hydrated lime and tailings, said tailings being of a larger particle size than that of said hydrated lime, said tailings consisting essentially of unhydrated lime and a nonhydratable residue, the improvement which comprises agitating said tailings with water in an agitation zone to produce a resulting aqueous mixture including additional hydrated lime and said residue, separating said additional hydrated lime from said residue in a separation zone as an aqueous suspension of fines, and recycling said suspension to said hydrating zone to provide a source of water for the hydration of further quicklime.

4. The improved process as set forth in claim 3 including the steps of discarding a portion of said residue from said separation zone, and passing a small amount of water counter-current to the discarded residue so as to wash the latter.

5. The improved process as set forth in claim 3 including the steps of removing a portion of said residue from said separation zone, and recycling said removed portion to said agitation zone.

6. A continuous process for hydrating lime which comprises introducing quicklime and water into a hydrating zone to produce powdered hydrated lime and tailings, said tailings consisting essentially of unhydrated lime and a nonhydratable residue, introducing said hydrated lime and said tailings to a product separator to remove said hydrated lime from said tailings, withdrawing said tailings from said product separator and introducing them to an agitation zone, introducing water to said agitation zone, agitating said water and said tailings in said agitation zone to produce a resulting aqueous mixture containing additional hydrated lime and a non-hydratable residue, introducing said aqueous mixture to a separation zone to effect separation of said residue from said aqueous mixture, and removing an aqueous suspension containing said additional hydrated lime from said separation zone and introducing said suspension to said hydrating zone to provide water therefor.

7. A continuous process for hydrating lime which comprises introducing quicklime and water into a hydrating zone to produce powdered hydrated lime and tailings, introducing said hydrated lime and said tailings to a product separator to remove said hydrated lime from said tailings, withdrawing said tailings from said product separator and introducing them to an agitation zone, introducing water to said agitation zone, agitating said water and said tailings in said agitation zone to produce a resulting aqueous mixture containing additional hydrated lime and a non-hydratable residue, introducing said aqueous mixture to a separation zone to effect separation of said residue from said aqueous mixture, removing an aqueous suspension containing said additional hydrated lime from said separation zone and introducing said suspension to said hydrating zone to provide water therefor, and removing said residue from said separation zone and recycling the same to said agitation zone.

8. A continuous process for hydrating lime which comprises introducing quicklime and water into a hydrating zone to produce powdered hydrated lime, tailings and steam, withdrawing steam from said hydrating zone and introducing said steam to a washing zone, introducing said hydrated lime and said tailings to a product separator to remove said hydrated lime from said tailings, withdrawing said tailings from said product separator and introducing them to an agitation zone, passing water through said washing zone to remove dust from said steam and to preheat said water, introducing said preheated water from said washing zone to said agitation zone, agitating said water and said tailings in said agitation zone to produce a resulting aqueous mixture containing additional hydrated lime and a residue, introducing said aqueous mixture to a separation zone to effect separation of said residue from said aqueous mixture, and removing an aqueous suspension containing said additional hydrated lime from said separation zone and introducing said suspension to said hydrating zone to provide water therefor.

9. A continuous process for hydrating lime which comprises introducing quicklime and water into a hydrating zone to produce powdered hydrated lime, tailings and steam, withdrawing steam from said hydrating zone and introducing said steam to a washing zone, introducing said hydrated lime and said tailings to a product separator to remove said hydrated lime from said tailings, withdrawing said tailings from said product separator and introducing them to an agitation zone, passing water through said washing zone to remove dust from said steam and to preheat said water, introducing said preheated water from said washing zone to said agitation zone, agitating said water and said tailings in said agitation zone to produce a resulting aqueous mixture containing additional hydrated lime and a residue, introducing said aqueous mixture to a separation zone to effect separation of said residue from said aqueous mixture, removing an aqueous suspension containing said additional hydrated lime from said separation zone and introducing said suspension to said hydrating zone to provide water therefor, and removing said residue from said separation zone and recycling the same to said agitation zone.

10. In a process for the hydration of lime wherein quicklime is admixed with water in a hydrating zone to produce powdered hydrated lime and tailings, said tailings being of a larger particle size than that of said hydrated lime, said tailings consisting essentially of unhydrated lime and a non-hydratable residue, the improvement which comprises mixing said tailings with water in an agitation zone to produce an aqueous mixture including additional hydrated lime and said residue, introducing said aqueous mixture to a separation zone to produce an overflow of said additional hydrated lime in aqueous suspension and passing said overflow to said hydrating zone.

References Cited in the file of this patent

UNITED STATES PATENTS 2,611,683     Knibbs _____ Sept. 23, 1952

FOREIGN PATENTS 702,001     Great Britain _____ Jan. 6, 1954

UNITED STATES PATENT OFFICE

CERTIFICATE OF CORRECTION

Patent No. 2,833,626                                                 May 6, 1958

Norman Victor Sydney Knibbs et al.

It is hereby certified that error appears in the above numbered patent requiring correction and that the said Letters Patent should read as corrected below.

In the grant, lines 2 and 3, and 12, and in the heading to the printed specification, lines 4 and 5, name of assignee, in each occurrence, for "Fawham Developments Limited" read -- Fawkham Developments Limited --.

Signed and sealed this 4th day of November 1958.

(SEAL)

Attest:
KARL H. AXLINE

Attesting Officer

ROBERT C. WATSON
Commissioner of Patents